United States Patent Office 3,490,201
Patented Jan. 20, 1970

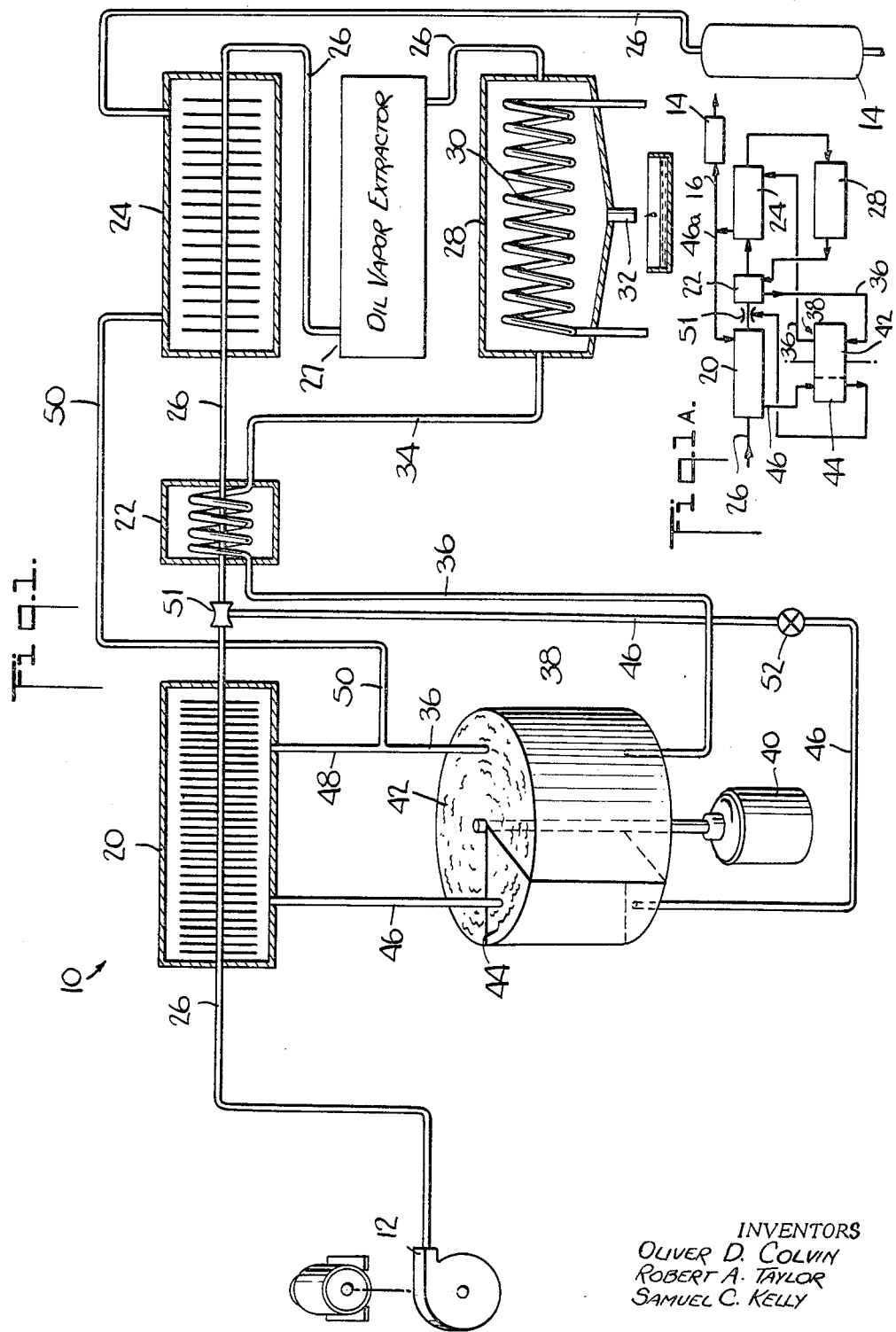

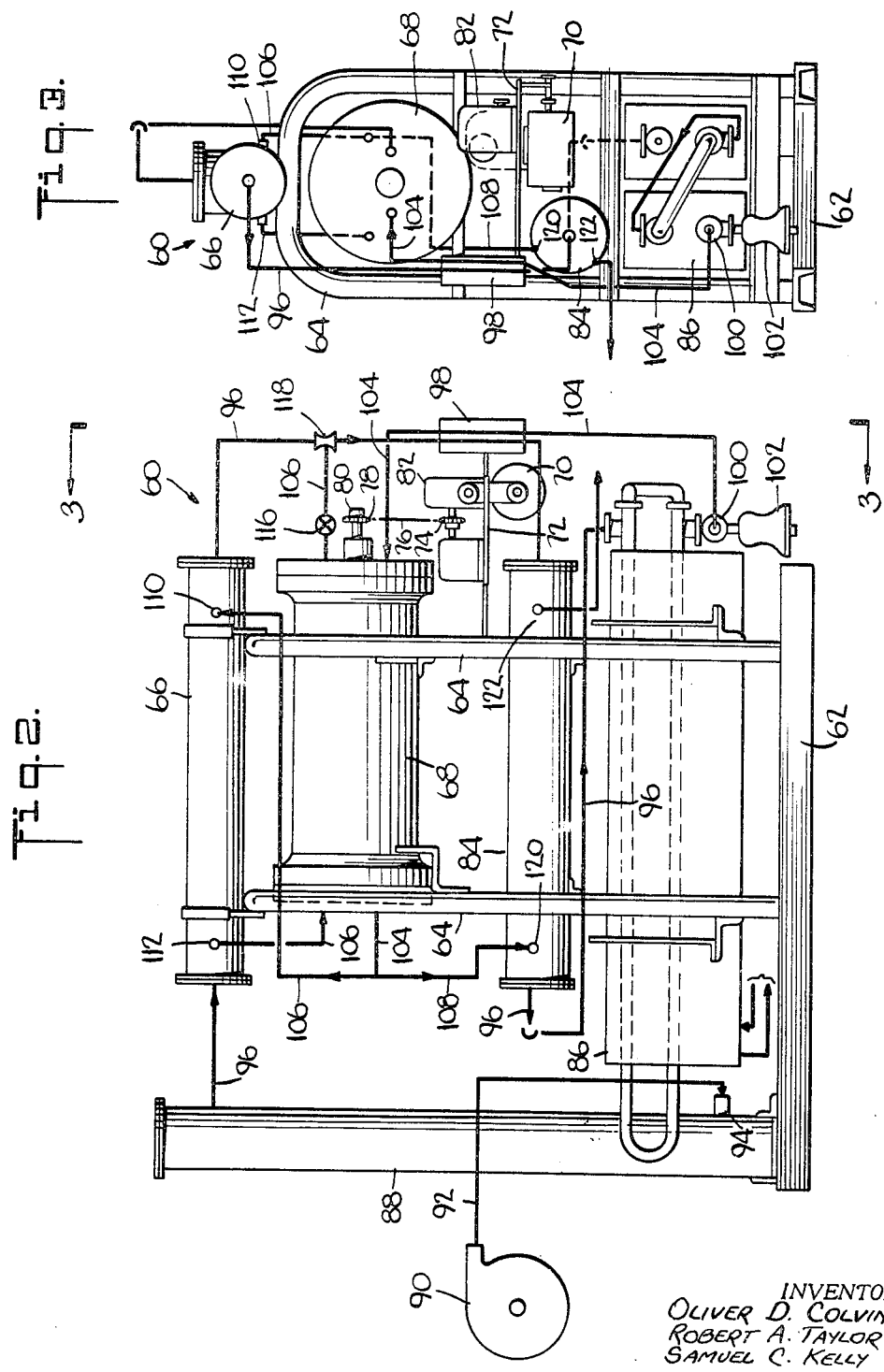

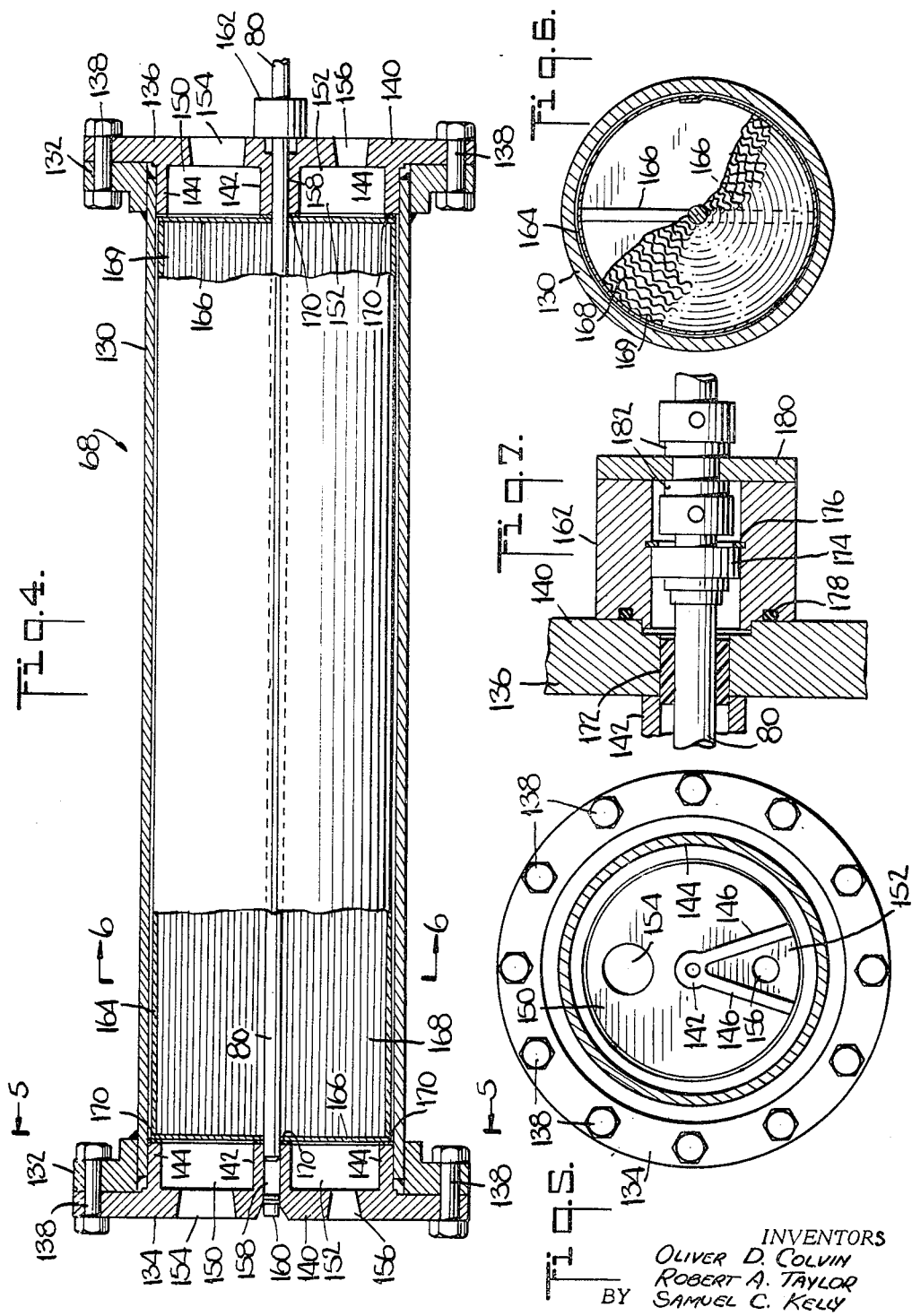

3,490,201
METHOD AND APPARATUS FOR DRYING GASES
Oliver Dyer Colvin, Hampton, N.H., Robert Archer Taylor, Newburyport, Mass., and Samuel Carroll Kelly, Exeter, N.H., assignors to Oliver D. Colvin, Hampton, N.H.
Filed Aug. 5, 1966, Ser. No. 574,875
Int. Cl. B01d 53/14; B01k 1/22
U.S. Cl. 55—31                                27 Claims

ABSTRACT OF THE DISCLOSURE

Method and apparatus for extracting moisture from gases, particularly hot, compressed gases, wherein the gases are passed through a desiccant substance and then a portion of them is heated and blown back through the desiccant to recondition it, and thereafter passing this portion of the gases through a condenser to extract this moisture by liquefication.

---

This invention relates to the processing of gases and more particularly it concerns the extraction of condensable moisture in liquid form from various gases.

The present invention is especially useful in connection with the drying of compressed air and other compressed gases. While it is true that when a gas is compressed, its moisture content does not change, nevertheless the vapor pressure of the moisture already in the gas increases proportionately to the increase in overall gas pressure. As the vapor pressure of the water vapor in the gas increases, the dewpoint temperature of the gas also increases; and, in fact, may increase to above ambient temperature with the result that condensation may occur. Since in many cases the compressed gas may be subjected to ambient temperatures which are below these higher dewpoint temperatures, a real danger exists that liquid droplets or even ice will form in the gas system. In many cases this could prove very troublesome, dangerous and expensive.

In the past, various dehumidification or drying systems have been devised in an attempt to lower the dewpoint of the compressed gas. By and large these prior systems were structurally complex and therefore were expensive to build. Also, they required relatively large amounts of energy to operate; and from an overall energy standpoint they were quite inefficient.

Another disadvantage of prior drying systems lay in the fact that their output would vary radically. That is, the dewpoint of the compressed gas would vary widely as the gas pressure was changed or as the dewpoint of the gas prior to compression was changed.

The present invention overcomes all of these disadvantages of the prior art. By means of the present invention it is possible to dehumidify compressed gases in a very efficient manner with relatively simple and low cost equipment. The equipment of the present invention is far smaller and requires far less power for a given load than conventional high pressure dehumidification equipment. Moreover, the present invention makes it possible automatically to maintain the dewpoint of the output gases to within a few degrees irrespective of wide variations which may occur in overall gas pressure or in dewpoint prior to compression. Also, with the present invention an amplifying effect can be obtained whereby sharp changes can be achieved in the output dewpoint of the compressed gas by making relatively small changes to the temperature and/or flow rate of a coolant which is supplied to the system.

In one aspect, the present invention makes use of a continuous recirculation concept, wherein there is maintained a continuously recirculating gas stream. This gas stream passes successively through a desiccant sorption zone, a heating zone, a desiccant desorption zone and a cooling or condensation zone. The gas to be dehumidified is injected into and mixed with the recirculating gas stream at a first location along the recirculation path while an equivalent amount of gas is diverted or ejected out from the recirculating stream at another location. As illustratively shown herein, the gas to be dried is injected ahead of the cooling or condensation zone while dried gas is diverted from a location beyond the desiccant sorption zone.

During recirculation of gases through the system, the desiccant material is caused to be exposed to the gases in different regions of the recirculating loop. For example, in the illustrative embodiment, different portions of the desiccant material are shifted continuously between the sorption zone and the desorption zone. As a result, the desiccant material does not serve to take moisture out of the overall gas stream; but instead it serves to concentrate the moisture into a minor portion of the stream. This has the effect of raising the relative humidity and dewpoint temperature of this minor portion of the recirculating stream to a point where its moisture is most effectively liquefied in the condensing or cooling zone.

A particularly significant problem found in prior art dehumidification systems employing desiccant materials is that of disposing of the high moisture content gases which have been used to desorb the desiccant material. Previously these gases have been merely thrown off and wasted. According to the present invention, these high moisture content gases are actually returned to the system input and reprocessed along with the incoming gases at a substantially constant pressure and in a continuous, uninterrupted, or non-cyclic operation. Thus no timing devices or manual operating adjustments are necessary.

In another of its aspects the present invention provides a heat transfer feedback whereby the cool dry gases which have passed through the condenser, and in some cases also through the desiccant material, are thereafter brought back into heat exchange relationship with the relatively hot and humid freshly compressed gases entering the system. This permits the cool dry gases to lower the dry bulb temperature of the hot incoming gases, thus bringing them close to the saturation point so that they can be demoisturized with maximum effectiveness and economy of coolant in the condenser.

Another feature of this heat transfer feedback aspect lies in the fact that it permits the portion of the dried gases used for desorption to be heated for this purpose by the freshly compressed hot incoming gases so that no external heat is required.

The features and aspects of the present invention are best realized by means of special mechanical arrangements to be described. These arrangements include a special drier wheel configuration which permits convenient and safe transfer of desiccant material between a sorbing region and a desorbing region.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore that the claims be regarded as including such equivalent constructions as do not depart from the spirit and scope of the invention.

A specific embodiment of the invention has been chosen for purposes of illustration and description, and are shown in the accompanying drawings, forming a part of the specification, wherein:

FIG. 1 is a schematic diagram illustrating a system which operates according to the present invention;

FIG. 1a is a line diagram illustrating a modified version of the system of FIG. 1;

FIG. 2 is a side elevational view of a compressed gas demoisturizing unit embodying the present invention;

FIG. 3 is a view taken along line 3—3 of FIG. 2;

FIG. 4 is a section view, taken in side elevation, and partially cut away of a dessicant drying wheel forming a part of the embodiment of FIGS. 2 and 3;

FIG. 5 is a view taken along line 5—5 of FIG. 4;

FIG. 6 is a view taken along line 6—6 of FIG. 4; and

FIG. 7 is an enlarged fragmentary view of an end axial portion of the arrangement of FIG. 4.

In the arrangement of FIG. 1, a demoisturizing system 10, according to the present invention, is interposed between an air compressor 12 and an air receiver or accumulator 14. The compressor 12 and the accumulator 14 may be of conventional construction and in many instances, may be the compressor and accumulator of an ordinary compressed air system which has already been installed. The demoisturizing system 10 is thus merely interposed along a line or conduit 26 interconnecting the compressor and accumulator.

Considering now the demoisturizing system 10 itself, it will be seen that the conduit 26 from the compressor 12 is connected to pass the compressed gases successively through a series of heat exchangers, known respectively as a reactivation heater 20, a relative humidity modifier 22 and an economizer 24. During their passage through the various heat exchangers, the gases in the conduit 26 give up the heat energy which was imparted to them during the compression process. This heat energy is not lost however, but is merely transferred through the walls of the conduit 26 to other gases passing through the heat exchangers. It will be noted that this heat transfer is accomplished without any mixing of the gases inside the heat exchangers.

In passing through the reactivation heater 20, the relative humidity modifier 22 and the economizer 24, the compressed gases in the conduit 26 become cooled toward their dewpoint temperature so that the relative humidity approaches 100 percent (i.e., saturation).

Just beyond the economizer 24, there is interposed in the line 26, an oil vapor extractor 27. This item is simply a housing in which is contained material capable of filtering the compressed gases and of absorbing various oil vapors from the gases. This material itself forms no part of the invention but merely conditions or cleans the gases so that the remainder of the system will not be damaged by foreign materials in the gases.

Beyond the oil vapor extractor 27, the conduit 26 opens into a condenser 28; and the gases from the conduit pass into heat exchange contact with a cooling coil 30 in the condenser. A coolant liquid, such as cooling tower water, tap water or brine is flowed continuously through the cooling coil 30 to extract heat from the gases within the condenser 28. This has the effect of extracting moisture in liquid form from the gases so that it can be physically separated therefrom by mechanical means and collected as in a trap 32 at the bottom of the condenser.

The thus far demoisturized gases from the condenser 28 are directed by a conduit 34 to the relative humidity modifier 22 where they become heated slightly by the gases passing through the conduit 26 therein. This has the effect of slightly reducing the relative humidity of the gases from the condenser so as to eliminate any liquid moisture (i.e., droplets or mist), which may be present in the gases coming from the condenser. Any such moisture may have serious deleterious effects on the desiccant material.

The gases which have been heated in the relative humidity modifier 22 are then passed by a conduit 36 into a sorbing sector of a desiccant containing drying wheel 38. The structure and operation of this wheel will be discussed in greater detail hereinafter, suffice it to say for present purposes that the wheel 38 is rotated continuously about its axis by means of a motor 40, so that different segments of the wheel necessarily form a first or sorbing sector 42 interposed in the conduit 36, and alternatively and in succession form a second or desorbing sector 44 interposed in a further conduit 46. As the wheel 38 rotates, different portions of the desiccant material contained in it are thus shifted in succession from one sector to another, and thereby are exposed at different times to the different gas streams in the two conduits 36 and 46.

The gases in the conduit 36 from the relative humidity modifier 22 are passed through the sorbing sector 42 of the drying wheel 38, and in the course of such passage they lose even more moisture to the desiccant material in the wheel. After passing through the wheel 38, the gases in the conduit 36 are divided into two branch conduits 48 and 50 which lead, respectively, to the reactivation heater 20 and the economizer 24. The gases from the branch conduits 48 and 50 become heated in each of these respective heat exchangers, and in so doing they correspondingly cool compressed gases which are freshly received from the compressor 12 and which are now passing through the conduit 26 within the heat exchangers.

The desiccant dried gases from the branch conduit 48 which are heated in the reactivation heater 20 by the later produced gases in the conduit 26, are thereafter passed through the conduit 46 into and through the desorbing sector 44 of the drying wheel 38. These gases are at a high temperature and very low vapor pressure and are thus doubly effective to extract moisture from the desiccant material in the sector 44 of the wheel.

The gases which have removed moisture from the wheel sector 44 continue to pass down through the conduit 46 and are reingested into the system so that the moisture which they have accumulated can be condensed out in liquid form in the condenser 28. As shown in FIG. 1, this is accomplished by directing the conduit 46 into a venturi type aspirator 51 located along the conduit 16 or 26 between the compressor 12 and the condenser 28. While the aspirator 51 is shown between the reactivation heater 20 and the relative humidity modifier 22, it may of course, be located anywhere along the conduit 26 between the compressor 12 and the condenser 28. A valve 52 is interposed in the conduit 46 and serves to regulate the ratio of ingested to total gases, so that, as will be explained, the system can be preset to handle different dewpoints and different overall flow rates.

The portion of the desiccant dried gases which pass along the branch conduit 50 and into the economizer 24 serve to cool the gases in the conduit 26 to a temperature nearer their dewpoint temperature so that the condenser 28 may operate more effectively to remove moisture from these gases in the form of disposable liquid. Thereafter the gases used to effect this cooling are transferred via the conduit 26 to the dry air receiver or accumulator 14.

In operation of the above described system the incoming gas from the compressor 12 is passed via the conduit 26, through the reactivation heater 20, the relative humidity modifier 22 and the economizer 24. These three heat exchangers serve to cool the hot freshly compressed gases, removing sensible heat, so that the dry bulb temperature of the gases may be brought very close to their dewpoint temperature by the time they have passed through all three heat exchangers. The gases are then in a condition such that significant further heat removed therefrom will result in the condensation of aqueous moisture. Oil vapors are then removed by passing the gases through the oil vapor extractor 27. Thereafter, the aqueous moisture is condensed out of the gases by means of the condenser 28. The cooling coil 30 of the condenser serves to remove latent heat of vaporization from the condensable vapors in the compressed gases, thus liquefying the vapors so that they can be removed by mechanical means.

The output of the condenser 28, although significantly reduced in moisture, neveretheless, is also reduced in dry bulb temperature so that its dry bulb and dewpoint temperatures are essentially the same and it remains at substantially 100 percent relative humidity.

The gases are then passed through the relative humidity modifier 22 where they become heated slightly to decrease their relative humidity and thus avoid the danger of liquid droplets being formed before the gases are presented to the drying wheel 38.

The gases from the relative humidity modifier 22 are directed through the sorbing sector 42 of the drying wheel 38 where more moisture is removed, and the dewpoint temperature of the gases is decreased to a very low level.

A portion of the gases from the sorbing sector 42 are directed by the branch conduit 48 to the reactivation heater 20 where they become heated by the now entering compressed hot gases which pass through the conduit 26. This heated portion of the dried gases is then passed down through the conduit 46 and through the desorbing sector 44 of the wheel. In so passing through the wheel, the heated gases extract moisture from the desiccant material and reactivate the material, so that it may thereafter be shifted into the sorbing sector 42 for further moisture sorption. The gases which have extracted moisture from the desorbing sector 44 are then mixed, via the aspirator 51, with the gases in the conduit 26 so that the extracted moisture can be removed from the system by the condenser 28.

In the meantime, the remaining portion of the gases which had been dried in the sorbing sector 42 of the wheel 38 pass through the branch conduit 50 to the economizer 24 where they serve to cool the incoming gases in the conduit 26 down to near saturation temperature for effective condensation. After performing this cooling fuction in the economizer, the dried gases are transferred to the dry air receiver or accumulator 14 for utilization.

It will be noted that the system of the present invention involves a continuous recirculatory loop. That is, gases recirculate from the aspirator 51, through the conduit 26, the condenser 28, the relative humidity modifier 22, the sorbing sector 42 of the drying wheel 38, the reactivation heater 20, the desorbing sector 44 of the wheel 38 and the conduit 46 back to the aspirator 51. While gases continue to recirculate through this loop, additional gases to be dried are injected into the loop at the aspirator 51 and mixed with the recirculating gases. At the same time, an equivalent amount of gases are ejected from the loop at the branch conduit 50 for utilization. The ejected gases are at substantially the same pressure and volume as the input gases, but are of much lower dewpoint.

The wheel 38 in the present invention is not the ultimate moisture removing factor. Actually the function of the wheel in conjunction with the recirculating loop is to absorb moisture from a large quantity of gas and then redeposit this same moisture back into a smaller quantity of the gas. It is possible by this technique to lower the dewpoint temperature of the gas leaving the loop to a far greater extent than is possible with a condenser alone. Moreover, by concentrating the moisture of a large quantity of gas into a smaller quantity, the dewpoint temperature of the smaller quantity is thus raised to a degree such that a condenser may operate more effectively to liquefy moisture from the gas; and in fact, the system may permit the lowering of output dewpoint to well below the temperature of the condenser coolant itself. This is particularly notable for the condenser coolant is the sole moisture extracting element in the system. Actually it has been possible to reduce 137° F. dewpoint air to below minus 20° F. dewpoint output using condenser cooling water at 58° F. entering temperature. This is particularly significant for when condensation above is used for dehumidification purposes, dewpoint reduction below 32° F. becomes impractical. This is because the moisture extracted from the gases immediately freezes on the condenser coils, impairing their heat transfer capability and impairing the free flow of gas through the condenser. The recirculating loop concept of the present invention, on the other hand, serves to mate a desiccant drying function with a condensation drying function in such manner that each serves to permit the other to operate in its most effective operating region.

Another and closely related feature of the present invention lies in a heat transfer feedback arrangement whereby the lower temperature gases which have passed through the condenser 28 are thereafter directed back into heat exchange relationship with the freshly compressed hot gases passing along through the conduit 26 so as to cool these gases to a condition where condensation can take place. Thus very little of the coolant which flows through the condenser coil 30 of the condenser need be used to lower the dry bulb temperature of the gases down to the dewpoint temperature without condensation. Rather, with the dry bulb temperature being made close to the dewpoint temperature as these gases come into the condenser 28, more and more of the cooling produced by the condenser coolant fluid will be effective to produce condensation of moisture from the gases. That is, the condenser is enabled to use most of its heat removing capacity for the removal of latent heat instead of for removal of sensible heat. At the same time, no heat energy is required for the system other than the cooling provided in the condenser; and no mechanical energy need be supplied other than is necessary to turn the drying wheel 38 about its axis.

In the modified arrangement of FIG. 1a the dried gases which have passed through the sorbing sector of the wheel 38, rather than dividing into branch conduits 48 and 50, instead pass along the conduit 36 to the economizer 24. They then are divided into two separate branches 16 and 46a. The portion which enters the branch 16 passes through to the accumulator 14, while the portion in the conduit 46a continues through the reactivation heater 20 for further heating; and thereafter this portion is passed via the conduit 46 back through the desorbing sector 44 of the wheel 38. From there the now moisture laden portion is reingested into the incoming gas conduit 26 at the venturi 51. It will be noted that in the alternate embodiment, the dried gases are passed in series through the economizer 24 and the reactivation heater 20 so that a more thermally efficient transfer of heat between the hot incoming gases and these cooler now dried gases is achieved.

FIGS. 2 and 3 show in somewhat more detail a unit 60 which may readily be incorporated into a compressed air system for use in dehumidifying the air which is produced by such a system. The unit is constructed on a base 62. Two inverted U-shaped support members 64 are mounted on the base 62 and a reactivation heater 66 of cylindrical configuration rests across the tops or bases, of the support member 64. The reactivation heater 66 operates similarly to the reactivation heater 20 of FIG. 1. A desiccant wheel, indicated generally at 68, also of generally cylindrical configuration, is supported below the base portions of the support members 64 with its axis parallel to that of the reactivation heater 66. The wheel 68, which will be described in greater detail hereinafter, is driven by means of a small drive motor 70. This motor is supported on a platform 72 which extends out from one of the support members 64. The motor is connected to drive a pulley 74 which in turn drives through a belt 76 to another pulley 78 on an axle shaft 80 which extends out from the wheel 68. A variable speed drive 82 is interposed between the motor 70 and the pulley 74.

An economizer 84, similar to the economizer 24 of FIG. 1, is mounted under the drying wheel 68 and a condenser 86 is mounted just under the economizer. Coolant fluid is passed into and out of the condenser via lines 87 from an external source (not shown). An oil vapor extractor 88 is mounted on the front of the unit.

Compressed air from a compressor 90 is supplied via a line 92 to a connector 94 near the bottom of the oil vapor extractor 88. The output of the oil vapor extractor is taken from the top thereof and supplied along a line 96 which passes through the reactivation heater 66 and down through a relative humidity modifier 98 to and through the economizer 84, and finally into the condenser 86. The condenser 86 is provided with an outlet 100. A condensate trap 102 extends down from the outlet 100 and serves to mechanically separate liquid moisture from the gases which have passed through the condenser. The outlet 100 is also connected to a conduit 104 which extends up through the relative humidity modifier 98 in heat exchange relationship with line 96. The conduit 104 then opens into a first or sorbing sector of the drying wheel 68. The conduit 104 emerges from the other end of the wheel and divides into two branches 106 and 108. The first branch 106 enters into the reactivation heater 66 at an input 110 and exists at an output 112. The branch 106 then opens into a second or desorbing sector of the wheel 68. Upon emerging from the other end of the wheel 68, the first branch conduit 106 passes through an adjustment valve 116 and into an aspirator 118 where the now wetter gases from the desorbing sector become mixed with new input gases passing along through the line 96.

The second branch conduit 108 enters into the economizer 84 at an input 120 and exists at an output 122 from where it passes to an accumulator or other utilization means not shown.

The operation of the above described unit is the same as that described in connection with FIG. 1. It will be noted that the arrangement of FIGS. 2 and 3 is particularly suitable for obtaining the recirculation and heat transfer feedback effects of the present invention with a very simple piping structure. This is because the various heat transfer units as well as the drying wheel 68 and the condenser 86 are arranged in stacked array so that the heat transfer feedback and recirculation loop paths are substantially completely made up by the various elements themselves and only a minor portion of these paths are covered by intermediate piping.

A particularly advantageous feature of the above described arrangement lies in the use of a venturi aspirator for ingestion and mixture of the gases from the desorbing portion of the desiccant material with the incoming gases to be dried. According to this feature a self leveling effect is obtained. That is, as the flow rate of the incoming gases increases so also does the flow rate of the aspirated and injected gases from the recirculating loop. Thus, the amount of gases in recirculation is automatically increased or decreased by an increase or decrease in the amount of gases to be dried, so that the ratio of recirculating gases to input gases is held to a controlled value. This self leveling value or ratio can be adjusted of course by limiting the flow of gases in the recirculating loop, for example, by control of the valve 116 in FIG. 2. Although reingestion can be accomplished by means of pumps, etc. the aspirator arrangement eliminates all moving parts, and is inherently self leveling.

FIGS. 4–7 inclusive show various details of the drying wheel 68 of the unit shown in FIGS. 2 and 3. As can be seen in FIG. 4, there is provided an outer tubular casing 130 on the ends of which are welded flange members 132. Flanged left and right end caps 134 and 136 are fastened by means of bolts 138 to each of the respective flange members 132. The end caps 134 and 136 are similar in construction, each comprising a main circular end wall portion 140 which is bolted near its periphery to the flange member 132, a central hub portion 142 extending inwardly from the main circular wall portion 140, and an inwardly extending circumferential wall 144 which fits closely inside the ends of the tubular outer casing 130. As shown in FIG. 5, the end caps 134 and 136 are provided with radial walls 146 which extend between the hub 142 and the circumferential wall 144 thus separating the inside region of the main circular end wall 140 into an absorption sector 150 and a desorption sector 152. Openings 154 and 156 are provided through the end wall 140 leading into each of these respective sectors.

The axle shaft 80 which as stated above, is driven by the motor 70, extends between central openings 158 in each of the hubs 142 of the end caps 134 and 136. The axle shaft 80 extends only part way into the left end cap 134, the outer end of the opening 158 being sealed by means of a plug 160. The opposite end of the axle shaft 156 however, extends completely through the opening 158 in the right end cap 136 and through a seal housing 162 to the pulley 78 (FIG. 2) so that it can be turned externally.

A rotating tubular member 164 is supported within the tubular outer casing 130 by means of spoke-like support members 166, turning with the axle shaft 80. The region between the axle shaft 80 and the rotating tubular member 164 is made up of a desiccant structure 168. This disiccant structure 168, as shown in FIG. 6, is made up of a continuous sheet of single faced corrugated material such as asbestos paper disposed spirally around the axle shaft 80 until it reaches the inner surface of the rotating tubular member 164. The corrugations in this material are oriented such that they define a plurality of small elongated passages 169 extending axially along the device from one end to the other. These passageways, it will be noted, are isolated from one another, so that the gases which pass through any one of them cannot flow over into another one during its passage through the device. Consequently, the gases which enter through the desorbing sector 152 at one end of the device, will only pass through those passages which are aligned with that particular sector and will not diffuse into passages which are oriented with the absorption sector 150.

The material making up the elongated axial passages is impregnated with a moisture sorbant halogen salt such as lithium chloride or the like. Thus, as the gases pass along this material, moisture will be transferred from the gas to the material or from the material to the gas depending upon the relative vapor pressures in these two media.

In order to insure that a reasonable seal is obtained between the absorption and desorption sectors 150 and 152, while permitting the desiccant structure 168 to rotate in close abutting relationship to the end caps 134 and 136, there are provided resilient seals 170 on the inner edges on the circumferential walls 144, the hubs 142 and the radial walls 146 of these end caps.

As shown in FIG. 7, the right end of the axle shaft 80 is supported within the hub 142 of the right end cap 146 by means of a bearing 172. There is additionally provided a seal member 174 between the axle shaft 80 and the inside surface of the seal housing 162. This shaft seal member 174 is secured in place by means of a snap ring 176. The seal housing 162 itself is bolted against the outside of the end wall portion 140 of the end cap 136 and is sealed thereto by means of an O-ring 178. The seal housing 162 is provided with an outer end plate 180 through which the axle shaft 80 extends. Thrust washers 182 are provided on the shaft 80 on opposite sides of the end plate 180 so as to limit outward axial movement of shaft 80 due to the difference of pressure between the inside and outside of the system.

It will be noted that the above described structure provides a very secure seal between the outside of the system and the inside portions thereof. While the seal provided by the Teflon gaskets separating the absorption and desorption sectors 150 and 152 do not provide as positive a seal, nevertheless, they do provide good separation between the two sectors due to the fact that the pressure differential between the two sectors is negligible. Thus there is little inducement for the gases of one sector to be forced over into the other sector.

During operation of the system, the drive motor 70 turns the axle shaft 80, and with it the desiccant structure 168 and the tubular member 164. Gases to be dried are passed into the wheel via one of the openings 154 and into the absorbing sector 150. These gases then pass through those passageways 169 in the desiccant structure 168 which happen to be aligned with the absorbing sector. Upon emerging from the desiccant structure, the gases pass out through the opening 154 in the other end plate. Similarly, and at the same time, hot dry gases to be used for desorption purposes are passed through the openings 156 and the desorbing regions 152. These gases pass through those passageways 169 in the desiccant structure 168 which happen to be aligned with the desorbing sector. The desiccant structure 168 rotates very slowly so that in most cases the gases which enter in one region remain in that region during their entire passage through the desiccant structure.

It will be appreciated that the above-described configuration permits the use of a continuously moving desiccant material in conjunction with high pressure gases, and at the same time, provides a positive gas seal which prevents the gases from leaking either to the atmosphere or from one flow channel to the other. Furthermore the peripheral seal prevents the gas streams from by-passing the wheel entirely.

The present invention is of course applicable to solvent recovery, i.e., the recovery of desired vapors in liquid form from gases in which they are contained. In such case the desired output occurs at the condenser trap rather than at the gas output of the system. Moreover, in its broader aspects, the present invention need not be limited to use with compressed gases. In fact very good results may be obtained through the use of the present invention in connection with the drying of gases at atmospheric or even subatmospheric pressures.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. A method for demoisturizing a gas stream comprising the steps of causing said stream to pass through a first desiccant-containing zone for extraction of moisture from said stream, then successively heating and passing a portion of said stream from said heating step directly through a second desiccant-containing zone to reactivate the desiccant material in said second zone by extraction of moisture therefrom, recovering the remainder of said stream, thereafter passing said portion along with said extracted moisture through a condenser to remove said moisture therefrom in liquid form, causing the desiccant material in said zones to become shifted with respect to the gas flows through said zones, and further heating said gas stream between said condenser and said first desiccant-containing zone by an amount sufficient to prevent liquification of moisture therein.

2. A method as in claim 1 wherein said portion is reinjected into said gas stream in advance of said first desiccant containing zone.

3. A method as in claim 1 wherein said gas stream is also passed through said condenser, along with said portion, in advance of passing through said first desiccant containing zone.

4. A method as in claim 1 wherein said portion is reinjected into said gas stream by aspiration achieved through the flow of said gas stream.

5. A method as in claim 1 wherein said heating is accomplished by passing said portion in heat exchange relationship with the incoming gas stream.

6. A method as in claim 1 wherein said gas stream from said first desiccant zone is divided into two separate branch streams, constituting respectively, said portion and said remainder of said stream, and wherein each branch stream is in heat exchange relationship with the incoming gas stream, the branch stream constituting said portion being upstream along said gas stream from the other branch stream.

7. A method for demoisturizing a stream of hot incoming gas, said method comprising the steps of cooling the gas, thereafter condensing moisture from the so cooled gas, passing gas having moisture thus condensed therefrom through a first desiccant containing zone and recovering dried gas therefrom, heating a portion of the gas which has had moisture condensed therefrom, passing the so heated portion of said gas through a second desiccant containing zone, causing the desiccant in said zones to become shifted therebetween, obtaining said cooling by passing the gas which has had moisture condensed therefrom into heat exchange relation with incoming gas to be demoisturized, and obtaining said heating by separately passing only said portion of gas into heat exchange relation with said incoming gas to be demoisturized in advance of its said cooling.

8. A method according to claim 7 wherein said portion of gas is used in said cooling in advance of its being separately passed into heat exchange relation with said incoming gas.

9. A method according to claim 7 wherein said portion of gas is separated from the gas which has had moisture condensed therefrom in advance of obtaining said cooling.

10. A method as in claim 7 wherein said branch streams pass together upstream in heat exchange relationship with said incoming gas stream and thereafter separate, with the branch stream constituting said portion continuing in heat exchange relation with said incoming gas stream in advance of passing through said second desiccant containing zone.

11. Apparatus for demoisturizing a gas comprising a condenser, first and second desiccant-containing enclosures, a gas heater means, gas conduit means interconnecting said condenser, said first desiccant-containing enclosure, said heater means, said second desiccant-containing enclosure and said condenser in series in a continuous loop, in a manner to permit gas to recirculate continuously at a substantially uniform and constant pressure, said gas conduit means being constructed to direct output gases from said heater directly into said second desiccant-containing enclosure without loss of heat therefrom, means for injecting gas to be demoisturized into said loop along the conduit means at a location between said two desiccant-containing enclosures on the condenser side thereof, means for removing demoisturized gas from said loop at a location between said two desiccant-containing enclosures on the heater side thereof, said loop being ohterwise closed, and further heater means along said loop exclusively between said condenser and said first disiccant-containing enclosure, said further heater means being of sufficient heating capacity to heat slightly the gases passing into said first desiccant-containing enclosure by an amount sufficient to prevent liquification therein.

12. Apparatus as in claim 11 wherein said means for injecting gas comprises an aspirating device.

13. Apparatus as in claim 12 wherein said aspirating device is arranged to be driven by the flow of the gas stream to be dried and to aspirate into said flow the gases from said second desiccant containing enclosure.

14. Apparatus as in claim 13 further including flow control means for controlling the rate of gas flow from said second desiccant containing enclosure.

15. Apparatus as in claim 11 wherein said gas heater means includes means for passing hot gases to be demoisturized into heat exchange relationship with the gases recirculating in said loop.

16. Apparatus as in claim 11 wherein said desiccant containing enclosures comprise a wheel containing desiccant material arranged to permit passage of gases along the surfaces thereof in a generally axial direction, a wheel casing mounting said wheel for rotation.

17. Apparatus as in claim 11 wherein said first and second desiccant containing enclosures comprise a wheel having a plurality of generally axially extending passageways formed by the desiccant material within the enclosures, a wheel casing mounting said wheel for rotation therein, each end of said casing having internal wall means forming sectoral zones, which zones are bounded on one side respectively by the opposed surfaces of said wheel, and means for continuously rotating said wheel within said casing.

18. Apparatus as in claim 17 wherein the ends of said casing each comprise an end wall from which a circumferential wall and a hub extend inwardly, two sector defining walls extending from said hub to said circumferential wall, said walls connecting at their inner end the facing surface of said wheel, and means connecting the two sectors formed by said sector defining walls to said conduit means.

19. Apparatus as in claim 18 wherein said wheel is made up of corrugated sheet material impregnated with a desiccant material and is coiled about an axle with the corrugations extending parallel to said axle.

20. Apparatus as in claim 11 wherein said gas heater comprises an inlet conduit for hot gases to be demoisturized and heat exchange means placing said conduit in heat exchange relation with the gases recirculating in the portion of said loop between said desiccant containing enclosures.

21. Apparatus as in claim 20 wherein there is provided a junction at the output of said first desiccant containing enclosure region, the separate branches of which extend through second passageways in different ones of said heat exchange units, and further including means directing the second passageway output from one of said heat exchange units through said second desiccant containing enclosure.

22. Apparatus as in claim 20 wherein said heat exchange means comprises a plurality of heat exchange units distributed along said inlet conduit.

23. Apparatus as in claim 22 wherein there is provided conduit means for directing all of the output of said first desiccant containing enclosure through at least one of said heat exchange units.

24. Apparatus as in claim 23 wherein there is provided a junction at the output of said one heat exchange unit and branch conduits leading from said junction respectively to an output and through a further heat exchange unit to said second desiccant containing enclosure.

25. Apparatus for demoisturing a gas comprising a condenser, first and second desiccant-containing enclosures, first and second gas heat exchangers, each having two gas flow paths, first gas conduit means permitting a gas to be demoistured to pass serially through one gas flow path of said first and then said second heat exchanger, then through said condenser and through said first desiccant-containing enclosure, second gas conduit means connected to said first desiccant-containing enclosure and the other gas flow path of each of said first and second heat exchangers, flow divider means arranged along said second gas conduit means on one side of said second heat exchanger and dividing the gas flow so that only a portion of the gases from said first desiccant-containing enclosure pass through said first heat exchanger and through said second desiccant-containing enclosure.

26. Apparatus according to claim 25 wherein said second gas conduit means is further constructed to permit said first portion and said remaining portion of the gas from the first desiccant-containing enclosure to pass together through said remaining gas flow path of said other heat exchanger, and to separate said first portion from said remaining portion following such passage and to direct said first portion only to the remaining gas flow path of said one heat exchanger.

27. Apparatus according to claim 25 wherein said second gas conduit means is further constructed to separate said first portion from said remaining portion between said condenser and said gas heat exchangers and to direct each portion to a different one of said heat exchangers.

References Cited

UNITED STATES PATENTS

| | | | |
|---|---|---|---|
| 1,810,312 | 6/1931 | Hasche | 55—35 |
| 2,519,531 | 8/1950 | Worn | 55—47 |
| 3,085,379 | 4/1963 | Kiyonaga et al. | 55—62 |
| 3,092,477 | 6/1963 | Persson | 55—390 |
| 3,140,931 | 7/1964 | McRobbie | 55—31 |
| 3,225,517 | 12/1965 | Wachsmuth | 55—31 |
| 3,287,883 | 11/1966 | Mott | 55—58 |
| 2,747,681 | 5/1956 | Schuftan et al. | 55—80 |
| 3,176,446 | 4/1965 | Siggelin | 55—196 |
| 3,292,346 | 12/1966 | Adams | 55—196 |

REUBEN FRIEDMAN, Primary Examiner

CHARLES N. HART, Assistant Examiner

U.S. Cl. X.R.

55—34, 60, 76, 208, 268